J. E. LEONARD.
FILM MOVING MECHANISM.
APPLICATION FILED MAY 19, 1919.

1,336,639.

Patented Apr. 13, 1920.
4 SHEETS—SHEET 1.

INVENTOR.
John E. Leonard.
By Hazard & Miller
ATTORNEYS

J. E. LEONARD.
FILM MOVING MECHANISM.
APPLICATION FILED MAY 19, 1919.

1,336,639.

Patented Apr. 13, 1920.
4 SHEETS—SHEET 4.

INVENTOR.
JOHN E. LEONARD.
BY Hazard & Miller
ATTORNEYS.

UNITED STATES PATENT OFFICE.

JOHN E. LEONARD, OF LOS ANGELES, CALIFORNIA, ASSIGNOR TO THE NATIONAL MOTION PICTURE CAMERA COMPANY, OF LOS ANGELES, CALIFORNIA, A CORPORATION OF CALIFORNIA.

FILM-MOVING MECHANISM.

1,336,639.  Specification of Letters Patent.  Patented Apr. 13, 1920.

Application filed May 19, 1919. Serial No. 298,293.

*To all whom it may concern:*

Be it known that I, JOHN E. LEONARD, a citizen of the United States, residing at Los Angeles, in the county of Los Angeles and State of California, have invented new and useful Improvements in Film-Moving Mechanism, of which the following is a specification.

My invention relates to film moving mechanisms and consists of the novel features herein shown, described and claimed.

The camera box 1 contains the film moving mechanism, and the box comprises a base 2, a partition 3 extending upwardly from the base 2 intermediate of its sides and from end to end, the sides 4 and 5 extending upwardly from the sides of the base, the rear end 6 extending from the rear end of the base and outwardly from the rear end of the partition 3, the top 7 extending outwardly from the upper edges of the partition 3, and the front 8 extending across the front end of the partition and connecting the sides and connecting the top and bottom.

The box 1 may be built up in various ways. As shown, the sides 4 and 5 are hinged to the base to swing outwardly and downwardly to provide access to the interior of the box.

The chamber 9 between the partition 3 and side 4 is the gear chamber, and the chamber 10 between the partition 3 and side 5 is the film chamber.

A recess 11 is formed from the front face of the front plate 8 to receive the shutter mechanism, not shown. A rectangular opening is formed through the front plate 8 to receive the aperture frame 12.

Figures 3, 7, 8, 9, 10, 11:
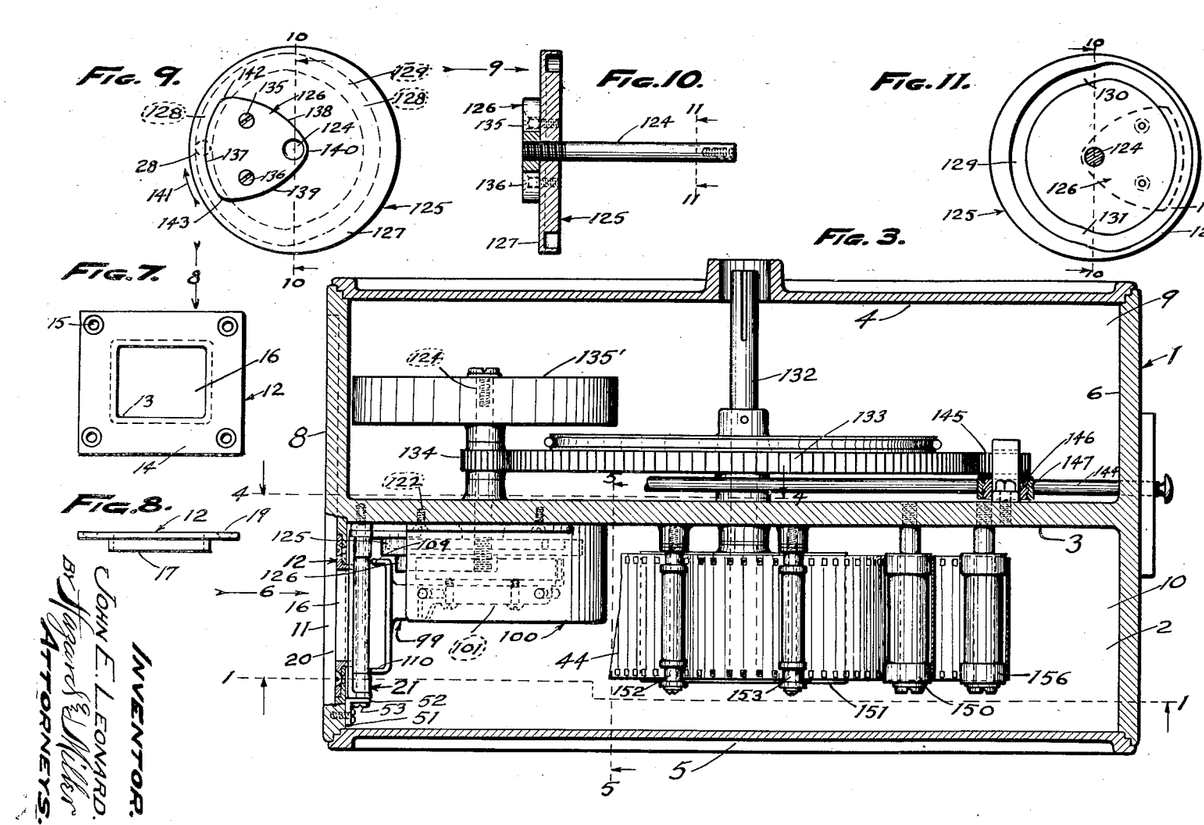
Fig. 3 is a horizontal section through the camera box on the line 3—3 of Fig. 1 and looking downwardly to show the film moving mechanism partly in plan and partly in section.
Fig. 7 is a front elevation of the frame around the exposure aperture as seen looking in the direction indicated by the arrow 6 in Figs. 1 and 3.
Fig. 8 is an edge view of the aperture frame as seen looking in the direction indicated by the arrow 8 in Fig. 7.
Fig. 9 is an elevation of the swinging aperture frame moving cam as seen looking in the direction indicated by the arrow 9 in Fig. 10 and as seen in Fig. 1.
Fig. 10 is a sectional detail on the line 10—10 of Figs. 9 and 11.
Fig. 11 is a cross section on the line 11—11 of Fig. 10 and looking in the direction indicated by the arrows and showing the swinging aperture frame moving cam in elevation as seen in Fig. 4, and as seen looking in the opposite direction from Fig. 9.

The aperture frame 12 is shown in detail in Figs. 7 and 8 and comprises a rectangular box 13 fitting in and extending through the opening in the plate 8, and a flange 14 extending outwardly all the way around the front of the box and having screw holes 15 in its corners. The box 13 is a four-sided frame open at its front and rear to form the exposure aperture 16, and the rear edge 17 of the box extends inwardly beyond the rear face 18 of the plate 8. The flange 14 is embedded into the plate 8 around the opening so that the front face 19 of the flange is flush with the front face 20 of the plate 8.

Figures 19, 20, 21, 22, 23, 24, 25:
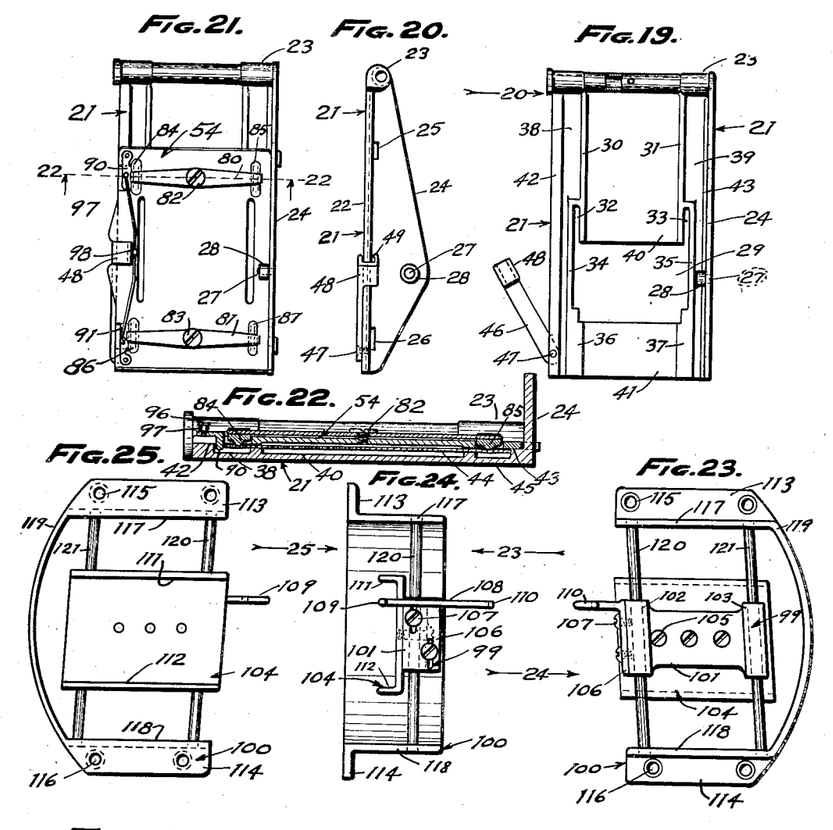
Fig. 19 is a rear elevation of the swinging aperture frame for moving the film to and from the film feeding or moving mechanism and as seen in Fig. 5.
Fig. 20 is an edge view looking in the direction indicated by the arrow 20 in Fig. 19.
Fig. 21 is a rear elevation showing the film gripping and aperture back plate shown in Fig. 13 upon the swinging aperture frame shown in Fig. 19 and as seen in Fig. 5.
Fig. 22 is an enlarged cross section on the line 22—22 of Fig. 21 and looking upwardly as indicated by the arrows.
Fig. 23 is a side elevation of the frame 100 and reciprocating head for moving the film as seen in Figs. 1 and 2, and looking in the direction indicated by the arrow in Fig. 24.
Fig. 24 is a front elevation as seen looking in the direction indicated by the arrow 24 in Fig. 23.
Fig. 25 is a side elevation looking in the opposite direction from Fig. 23 as indicated by the arrow 25 in Fig. 24.
Figure 26:
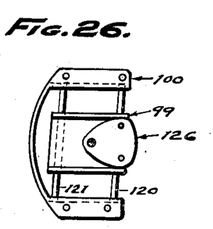
Fig. 26 is a view analogous to Fig. 25 upon a reduced scale and showing the film moving cam in one position.
Figure 27:
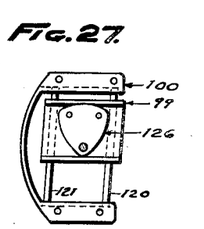
Fig. 27 is a view analogous to Fig. 26 and showing the cam in another position.

The swinging aperture frame 21 is mounted to swing back and forth against the rear face 18 of the plate 8, and the details of the swinging aperture frame 21 are shown in Figs. 19 and 20. The frame is rectangular in front or rear elevation and consists of a flat plate 22, a bearing 23 extending across the upper end of the plate 22, and a flange 24 extending at right angles backwardly from the right-hand edge of the plate 22. Rectangular openings 25 and 26 are formed through the flange 24 just back of the plate 22, a stud 27 is fixed in the flange, and a roller 28 is mounted upon the stud against the inner side of the flange.

The aperture 29 is larger than the aperture 16 in the aperture frame 12. Ribs 30 and 31 extend from the bearing 23 downwardly to the aperture 29, said ribs being parallel and wide enough apart to allow the body of the film to pass between the ribs with the perforated margins of the film bearing upon the ribs so as to protect the sensitized face of the film from friction with the plate 22. Slots 32 and 33 extend laterally from the body of the aperture 29 and upwardly outside of the lower ends of the ribs 30 and 31, there being ribs 34 and 35 outside of the slots 32 and 33, and ribs 36 and 37 extend downwardly from the aperture 29 in line with the ribs 30 and 31. The ribs 34 and 35 connect the ribs 30 and 31 to the ribs 36 and 37 so as to make a continuous bearing surface for the margins of the film. Faces 38 and 39 outside of the ribs 30, 31, 34, 35, 36 and 37 are level with the faces 40 and 41, and the ribs 42 and 43 extend backwardly at the outer edges of the faces 38 and 39 slightly beyond the faces of the ribs. The distance between the ribs 42 and 43 is slightly greater than the width of the film 44 so that the film may lie upon the ribs 30, 31, 34, 35, 36 and 37, as shown in Fig. 22, with one edge of the film engaging the rib 43. The front face 45 of the swinging aperture frame 21 is flat to fit closely against the rear face of the plate 8, and the aperture 29 is large enough to fit around the box 13 of the aperture frame 12. An arm 46 is connected at its lower end to the lower left-hand corner of the plate 22 by a rivet 47, a U-shaped clamp 48 is formed integral with the swinging end of the arm 46, the end 49 of the clamp being inclined inwardly, and a recess 50 is formed in the rear face of the plate 8 to receive the arm 46, so that the plate 22 may fit against the face of the plate 8.

Figures 4, 5, 6, 12, 13, 14, 15, 16, 17, 18:
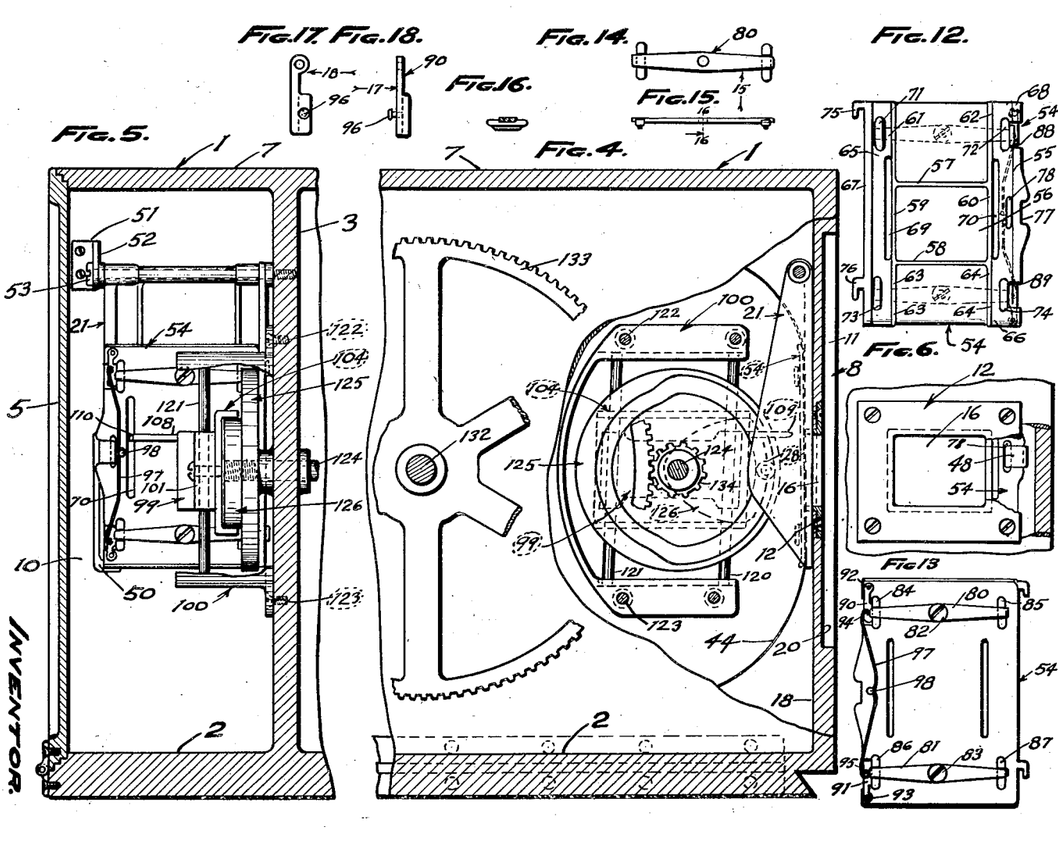
Fig. 4 is a fragmentary vertical longitudinal section substantially on the line 4—4 of Fig. 3 and looking in the direction indicated by the arrows, parts being broken away to show the opposite side of the film moving mechanism from the side shown in Fig. 1.
Fig. 5 is a vertical cross section on the line 5—5 of Fig. 3 and looking in the direction indicated by the arrows and for the purpose of showing a rear view of the film moving mechanism.
Fig. 6 is a fragmentary front elevation looking in the direction indicated by the arrows 6 in Figs. 1 and 3 and looking directly into the exposure aperture.
Fig. 12 is a front elevation of the film gripping and aperture back plate and showing the face which contacts with the back of the film.
Fig. 13 is a rear view of the film gripping and aperture back plate shown in Fig. 12.
Fig. 14 is a rear elevation of one of the gripping arms shown in Fig. 13.
Fig. 15 is an edge view looking in the direction indicated by the arrow 15 in Fig. 14.
Fig. 16 is a cross section on the line 16—16 of Fig. 15.
Fig. 17 is a rear elevation of one of the spring pressed film guides as seen in Fig. 5 and looking in the direction indicated by the arrow 17 in Fig. 18.
Fig. 18 is an edge view looking in the direction indicated by the arrow 18 in Fig. 17.

Referring to Fig. 5, a bracket attaching plate 51 is secured to the rear face of the plate 8, and a bearing 52 extends from the plate 51, and a screw 53 is inserted through the bearing 52, through the bearing 23 and tapped into the partition 3 so as to support the swinging aperture frame 21 upon the screw 53.

Figure 1:
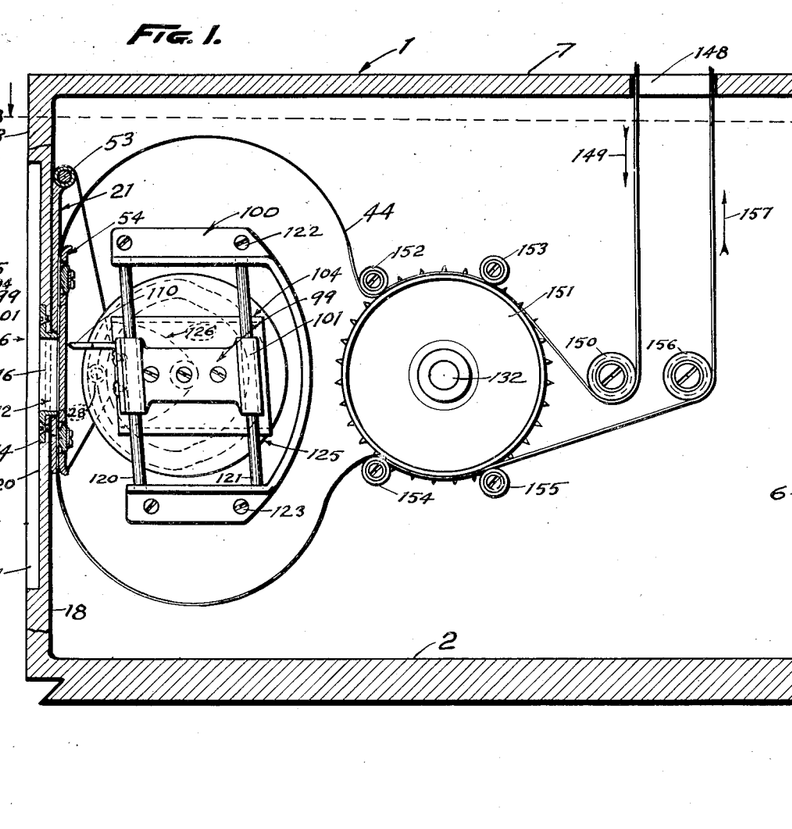
Figure 1 is a vertical longitudinal section of a camera box showing a film moving mechanism embodying the principles of my invention in operative position in the box, the parts being in position to hold the film for an exposure, and the view being taken on the line 1—1 of Fig. 3 and looking in the direction indicated by the arrows.
Figure 2:
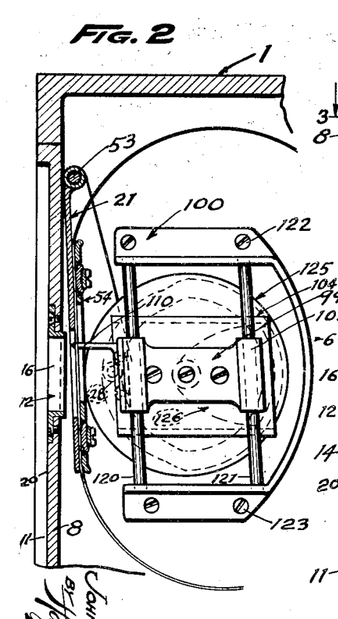
Fig. 2 is a fragmentary view on the same plane as Fig. 1 and showing the parts in position to release the film and advance the film.

The film gripping and aperture back plate 54 fits against the swinging aperture frame 21, and the details are shown in rear elevation in Figs. 5, 12, 13 and 21, and in vertical section in Figs. 1 and 2, and in horizontal section in Fig. 22.

In Fig. 12 the plate 54 is shown in front elevation, that is the face shown in Fig. 12 contacts with the face of the plate 21 shown in Fig. 19. The details of the plate 54 are as follows:

The flat body 55 has a film back 56 substantially the same size as the exposure aperture, said film back being upon the back side of the film area at the instant of exposure. A rib 57 extends across the top of the film back 56, a similar rib 58 extends across the bottom, and ribs 59 and 60 connect the ends of the ribs 57 and 58 to make a rectangular frame, and at the instant of exposure this frame presses the film against the edge 17 of the rectangular box 13. Ribs 61 and 62 extend upwardly in line with the ribs 59 and 60, and similar ribs 63 and 64 extend downwardly, said ribs 59, 60, 61, 62, 63 and 64 being at the opposite side of the film from the ribs 30, 31, 34, 35, 36 and 37 so as to press the perforated margins of the film and guide the margins between the two plates 21 and 54 and relieve the sensitized face of the film of the rubbing contact. Clearance spaces 65 and 66 are formed outside of the ribs to match the clearance spaces 38 and 39, and the ribs 67 and 68 are formed outside of the clearance spaces 65 and 66 to match the ribs 42 and 43. Slots 69 and 70 are formed through the body 55 outside of the ribs 59, 60, 61 and 62 to match the slots 32 and 33. Elongated openings 71, 72, 73 and 74 are formed through the corners of the body 55 at the ends of the clearance spaces 65 and 66. Hooks 75 and 76 extend outwardly and downwardly from the body 55 at the left-hand side, said hooks engaging in the openings 25 and 26 of the flange 24. A notch 77 is formed in the right-hand side of the body 55, and an opening 78 is formed through the body in horizontal alinement with the notch. The clamp 48 fits in the notch 77 and the end 49 snaps over a bar inside of the opening 78. At this time the clamp 48 embraces the plate 22 and the bar 79 to hold the swinging aperture frame 21 and back plate 54 together.

Referring to Fig. 13, spring bars 80 and 81 are secured crosswise of the upper and lower ends of the body 55 by screws 82 and 83, said bars being on the back, or outer, side of the body 55. Steel pads 84 and 85 are secured to the ends of the bar 80 in position to extend through the openings 71 and 72 and press the margins of the film into the clearance spaces 38 and 39, thereby pressing the film against the ribs 30 and 31, and steel pads 86 and 87 are fixed to the ends of the bar 81 and extend through the openings 73 and 74 to engage the film in the same way. The bars 80 and 81 are elastic and the tensions of the pads 84, 85, 86 and 87 upon the film may be accurately adjusted by manipulating the screws 82 and 83, the object being to place enough tension upon the film so that it will stand still at the instant of exposure, and while the moving mechanism is going back to get a new hold on the film.

Notches 88 and 89 are formed from the edge of the body 55 in line with the openings 72 and 74 and through the ribs 68, and dogs 90 and 91 are pivotally connected to the body 55 by pins 92 and 93. Guide heads 94 and 95 are formed upon the swinging ends of the dogs and extend into the notches 88 and 89 to engage the edge of the film and press the film against the rib 43 to hold the film from vibrating edgewise. Pins 96 project from the back sides of the heads. A spring 97 is secured to a pin 98 at its center and the ends of the spring engage the pins 96, as shown in Fig. 5, the tensions of the two ends of the springs being exerted to hold the heads 94 and 95 yieldingly in engagement with the edge of the film.

The reciprocating head 99 for moving the film is mounted in the frame 100. The details of the head 99 and frame 100 are shown by themselves in Figs. 23, 24, 25, 26 and 27, and in assembled and operative positions in Figs. 1, 2, 3, 4 and 5. The head 99 comprises a body 101 having substantially vertical parallel bearings 102 and 103 at its ends, and the cam plate 104 secured to the body 101 by screws 105. An attaching plate 106 fits against the front face of the bearing 102 and is secured in place by screws 107, a crossbar 108 extends horizontally laterally from the upper end of the attaching plate 106, and the feeding forks 109 and 110 extend forwardly from the ends of the crossbar 108, said feeding forks 109 and 110 extending and reciprocating back and forth and up and down through the slots 32 and 33 in the swinging aperture frame 21, and through the slots 69 and 70 in the aperture back plate 54, and through the perforations in the film. The cam plate 104 has horizontal parallel straight flanges forming cam faces 111 and 112.

The frame 100 comprises attaching plates 113 and 114 having screw holes 115 and 116, supporting flanges 117 and 118 extending from the inner edges of the plates 113 and 114, a brace 119 connecting the rear ends of the plates 113 and 114 and the rear ends of the flanges 117 and 118, and bearing rods 120 and 121 extending through the bearings 102 and 103 and fixed in the flanges 117 and 118.

Referring to Fig. 2, the attaching plates 113 and 114 are secured to the partition 3 by screws 122 and 123, so that the rods 120 and 121 stand parallel with the swinging aperture frame 21 when the frame 21 swings away from the front plate 8, and so that the forks 109 and 110 extend through the perforations in the film in this position, and so that when the frame 21 swings against the front plate 8, as in Fig. 1, the forks 109 and 110 are withdrawn from the perforations in the film.

The cam shaft 124 is mounted through the partition 3. The swinging aperture frame moving cam 125 is fixed upon the shaft 124, and the film moving cam 126 is fixed to the cam 125. The swinging aperture frame moving cam 125 consists of a flat disk 127 having a concentric cam groove 128 extending substantially half way around, and a second concentric cam groove 129 extending substantially the other half way around. The two grooves 128 and 129 are joined by irregular curves 130 and 131 and form a continuous track for the roller 28, so that as the shaft 124 rotates the swinging aperture frame 21 is moved back and forth from the position shown in Fig. 1 to the position shown in Fig. 2. The concentric groove 128 is farthest from the shaft 124, and when the roller is traveling from one end of the groove 128 to the other end, the frame 21 is in the position shown in Fig. 1 and the film is standing still and receiving an exposure through the aperture 16, and while the roller 28 is traveling in the groove 129 the swinging aperture frame 21 is in position shown in Fig. 2 and standing still and the film is being moved from one exposure area to the next. The moving of the frame 21 from the position shown in Fig. 1 to the position shown in Fig. 2, and from the position shown in Fig. 2 to the position shown in Fig. 1 takes place when the roller 28 is passing the curved portions 130 and 131, so that the film is standing still during 180° of the revolution of the shaft 124 for exposure and the frame 21 is standing still during the other 180° of the revolution of the shaft 124 for the movement of the film, the 180° being reduced slightly in both instances by the time required to pass the curves 130 and 131. The cam may be differently divided, or timed, by moving one curve relative to the other so as to put more than 180° in one side and less than 180° in the other side of the dividing line.

The crank shaft 132 is mounted through the partition 3, a gear 133 is fixed upon the crank shaft 132 on the opposite side of the partition 3 from the film moving mechanism, and a pinion 134 is fixed upon the cam shaft 124 so that when the crank is applied to the shaft 132 and operated the cam shaft will run at a high rate of speed. A fly wheel 135' is fixed upon the cam shaft 124 to steady the motion.

The film moving cam 126 is a flat plate secured against the opposite side of the cam 125 from the grooves 128 and 129 by screws 135 and 136. The cam shaft 124 passes through the film moving cam 126 and the cam face 137 is concentric to the shaft 124. The cam faces 138 and 139 are rounded and extend from the ends of the cam face 137 almost on radial lines, said cam faces 138 and 139 passing on opposite sides of the shaft 124 and meeting in a third rounded cam face 140. The film moving cam 126 is set relative to the swinging frame cam 125, so that when the frame 21 is holding the film in exposure position, as in Fig. 1, the forks 109 and 110 are moving upwardly to get a new hold on the film, the cam is rotating in the direction indicated by the arrow 141, and the cam face 138 is engaging the cam face 111, and a quick up movement of the forks is produced.

When the contact between the cam 126 and the cam face 111 passes a rounded juncture 142 between the face 138 and the face 137 the forks are at the upper ends of their movements, and while the cam is passing from the juncture 142 to the opposite juncture 143 the forks are standing still, and during this time the frame 21 is moving outwardly, so that the forks will pass through the perforations in the film; then while the contact is moving from the juncture 143 to the juncture 142 along the faces 139, 140 and 138 there is a quick action of the forks which pulls the film down the length of one film exposure area; then while the contact is moving from the juncture 142 to the juncture 143 the forks are held still in their lower positions while the film is pushed off the forks, that is while the forks are withdrawn from the apertures in the film. Thus I get a quick movement of the film from one exposure to the next, a quick return of the moving forks, and the forks stand still while the film is being placed upon the forks and while the film is being removed from the forks.

The shutter, not shown, is driven from the shaft 144 connected to the crank shaft 132 through the gear 133, the pinion 145 meshing with the gear 133 and having a bevel gear face 146 meshing with the bevel gear 147 upon the shaft 144.

The film box, not shown, is mounted above the box 1 and the film 44 runs down from the film box through the opening 148 in the box 1, in the direction indicated by the arrow 149, around the guide roller 150, over the sprocket 151, under the guide rollers 152 and 153, then down between the swinging aperture frame 21 and film gripping and aperture back plate 54 past the exposure aperture 16, then over the guide rollers 154 and 155, under the sprocket 151, around the guide roller 156, and upwardly through the opening 148 in the direction indicated by the arrow 157. The sprocket 151 is fixed upon the crank shaft 132, and the guide rollers 152 and 153 hold the film in engagement with the sprocket to drive the film toward the film moving mechanism, and the guide rollers 154 and 155 hold the film in engagement with the sprocket to drive the film away from the film moving mechanism.

The film is placed in position so that there is a surplus of film between the roller 152 and the top of the film gripping and aperture back plate 54, and a corresponding surplus of film between the bottom of the plate 54 and the roller 154, so that the sprocket 151 may run continuously and the film be fed intermittently past the exposure aperture. In other words, there is a slack loop of film 44 between the guide roller 152 and the guide roller 154, and this loop of film may be removed from the film moving mechanism by manipulating the clamp 48 and swinging the clamp outwardly to release the plate 54, so that the plate 54 may be removed bodily to release the loop of film.

Various changes may be made without departing from the spirit of my invention as claimed.

I claim:

1. In a film moving mechanism, a swinging aperture frame having an opening adapted to register with an exposure aperture, a film gripping and aperture back plate removably connected to the swinging aperture frame and forming a back for the exposure aperture, and steel pads yieldingly mounted through the film gripping and aperture back plate to engage the perforated margins of the film and press the margins against the swinging aperture frame.

2. In a film moving mechanism, a swinging aperture frame having an opening adapted to register with an exposure aperture and having parallel ribs extending from its rear face to be engaged by the perforated margins of a film and a stop rib extending from one side to be engaged by the one edge of the film, and a film gripping and aperture back plate operatively mounted against the rear face of the swinging aperture frame and having spring pressed dogs to engage the other edge of the film and press the film against the stop rib.

3. In a film moving mechanism, a swinging aperture frame having an opening adapted to register with an exposure aperture, a stop rib extending from one side to be engaged by one edge of a film, a film gripping and aperture back plate operatively mounted against the rear face of the swinging aperture frame and having spring pressed dogs to engage the other edge of the film and press the film against the stop rib.

4. In a film moving mechanism, a swinging aperture frame comprising a flat plate having an opening adapted to register with an exposure aperture and a flange extending at right angles backwardly from the flat plate and having openings just back of the flat plate; a film gripping and aperture back plate comprising a flat plate having hooks extending from one edge and adapted to fit in the openings in the flange, and a clamp pivotally connected to the opposite edge of the flat plate from the flange and adapted to engage the opposite edge of the film gripping and aperture back plate from the hooks to hold the swinging aperture frame and the film gripping and aperture back plate removably together.

5. In a film moving mechanism, the combination with a front plate having an opening and an aperture frame comprising a rectangular box fitting in and extending through the opening and having an edge beyond the rear face of the front plate, of a swinging aperture frame mounted to swing back and forth against the rear face of the front plate and having an aperture through which the rectangular box extends, and a film gripping and aperture back plate connected to the swinging aperture frame and forming a back for the exposure aperture and adapted to press a film against the edge of the rectangular box.

6. In a film moving mechanism, the combination with a front plate having an opening and an aperture frame comprising a rectangular box fitting in and extending through the opening and having an edge beyond the rear face of the front plate, of a swinging aperture frame mounted to swing back and forth against the rear face of the front plate and having an aperture through which the rectangular box extends, a film gripping and aperture back plate connected to the swinging aperture frame and forming a back for the exposure aperture and adapted to press a film against the edge of the rectangular box, means for swinging the aperture frame back and forth, and means for advancing a film step by step between the swinging aperture frame and the film gripping and aperture back plate.

7. In a film moving mechanism, the combination with a front plate having an opening and an aperture frame comprising a rectangular box fitting in and extending through the opening and having an edge beyond the rear face of the front plate, of a swinging aperture frame mounted to swing back and forth against the rear face of the front plate and having an aperture through which the rectangular box extends, a film gripping and aperture back plate connected to the swinging aperture frame and forming a back for the exposure aperture and adapted to press a film against the edge of the rectangular box, means for swinging the aperture frame back and forth, means for advancing a film step by step between the swinging aperture frame and the film gripping and aperture back plate, and adjustable friction means for pressing the perforated margins of the film against the swinging aperture frame.

8. In a film moving mechanism, the combination with a front plate having an opening and an aperture frame comprising a rectangular box fitting in and extending through the opening and having an edge beyond the rear face of the front plate, of a swinging aperture frame mounted to swing back and forth against the rear face of the front plate and having an aperture through which the rectangular box extends, a film gripping and aperture back plate connected to the swinging aperture frame and forming a back for the exposure aperture and adapted to press a film against the edge of the rectangular box, a stop rib on the swinging aperture frame to engage one edge of the film, and spring pressed dogs to engage the other edge of the film to press the film against the stop rib.

9. In a film moving mechanism, the combination with a front plate having an opening and an aperture frame having a rectangular box fitting in and extending through the opening and having an edge beyond the rear face of the front plate, an aperture frame mounted to swing back and forth against the rear face of the front plate and having an aperture through which the rectangular box extends, a film gripping and aperture back plate carried by the swinging aperture frame and forming a back for the exposure aperture and adapted to receive a film between the aperture frame and the back plate and adapted to press the film against the edge of the rectangular box and having vertical slots in line with the perforated edges of the film, of a head mounted to reciprocate in a plane parallel with the backward position of the aperture frame, means for reciprocating the head, and forks extending from the head and adapted to pass through the perforations in the film and move the film while the aperture frame is in its backward position and release the film when the aperture frame is in its forward position.

10. In a film moving mechanism, the combination with a front plate having an opening and an aperture frame having a rectangular box fitting in and extending through the opening and having an edge beyond the rear face of the front plate, an aperture frame mounted to swing back and forth against the rear face of the front plate and having an aperture through which the rectangular box extends, a film gripping and aperture back plate carried by the swinging aperture frame and forming a back for the exposure aperture and adapted to receive a film between the aperture frame and the back plate and adapted to press the film against the edge of the rectangular box and having vertical slots in line with the perforated edges of the film, of a head mounted to reciprocate in a plane parallel with the backward position of the aperture frame, means for reciprocating the head, forks extending from the head and adapted to pass through the perforations in the film and move the film while the aperture frame is in its backward position and release the film when the aperture frame is in its forward position, and adjustable friction means for holding the film while the forks are out of engagement with the film.

11. In a film moving mechanism, the combination with a front plate having an opening and an aperture frame comprising a rectangular box fitting in and extending through the opening and having an edge beyond the rear face of the front plate, an aperture frame mounted to swing back and forth against the rear face of the front plate and having an aperture through which the rectangular box extends, a film gripping and aperture back plate carried by the aperture frame and forming a back for the exposure aperture and adapted to receive a film between the aperture frame and the back plate, of a head mounted to reciprocate in a plane parallel with the back position of the aperture frame, forks carried by the head and adapted to pass through the perforations in the film, means for swinging the aperture frame, means for reciprocating the head so that the aperture frame stands still while the forks are passing into and out of the perforations in the film and while the film is being moved from one step to another, and adjustable friction means for holding the film while the forks are out of the perforations.

12. In a film moving mechanism, a swinging aperture frame comprising a flat plate having an opening adapted to register with an exposure aperture and a flange extending at right angles backwardly from one edge of the flat plate, a cam shaft rotatably mounted, a cam upon the cam shaft, a stud fixed in the flange, and a roller mounted upon the stud and engaging the cam so that as the cam shaft rotates the aperture frame is swung back and forth.

13. In a film moving mechanism, a swinging aperture frame comprising a flat plate having an opening adapted to register with an exposure aperture and a flange extending at right angles backwardly from one edge of the flat plate, a cam shaft rotatably mounted, a cam upon the cam shaft and having a concentric cam groove extending less than half way around the axis and a second concentric cam groove extending less than the other half way around and curves connecting the ends of the grooves, a stud fixed in the flange, and a roller mounted upon the stud and engaging in the cam grooves so that the aperture frame will be moved quickly one way and held an instant and moved quickly the other way and held an instant.

14. In a film moving mechanism, a swinging aperture frame, a film gripping and aperture back plate carried by the swinging aperture frame and adapted to receive a film between the aperture frame and the back plate and having vertical parallel slots adapted to register with the perforations in the film, a head mounted to reciprocate back of the back plate, forks extending from the head and adapted to pass through the slots and reciprocate in the slots, a cam shaft rotatably mounted, flanges extending from the head, and a cam upon the cam shaft between the flanges and adapted to reciprocate the head quickly one way and hold it an instant and then reciprocate the head quickly the other way and hold it an instant so as to make an intermittent reciprocating motion of the forks.

15. In a film moving mechanism, a swinging aperture frame, a film gripping and aperture back plate carried by the swinging aperture frame and adapted to receive a film between the aperture frame and the back plate and having vertical parallel slots adapted to register with the perforations in the film, a head mounted to reciprocate back of the back plate, forks extending from the head and adapted to pass through the slots and reciprocate in the slots, means for intermittently moving the aperture frame, and means for intermittently moving the forks, so that the frame is standing still while the forks are moving downwardly or upwardly, and so that the forks are standing still while the frame is moving forwardly or backwardly.

16. In a film moving mechanism, means for guiding a film, reciprocating forks for advancing the film step by step, means for operating the forks intermittently, and means for swinging the guiding means intermittently back and forth, so that the forks stand still while the guiding means is moving to or from the forks, and so that the guiding means stand still at the instant of exposure and at the instant of movement.

In testimony whereof I have signed my name to this specification.

JOHN E. LEONARD.